(12) United States Patent
Gogulapati et al.

(10) Patent No.: US 12,233,344 B2
(45) Date of Patent: Feb. 25, 2025

(54) VIDEO GAME WITH REAL WORLD SCANNING ASPECTS (71) Applicant: Activision Publishing, Inc., Santa Monica, CA (US)

(72) Inventors: Ranjani Gogulapati, Lake Forest, CA (US); Alykhan Lyakat Kaba, Los Angeles, CA (US); Lee Morris Reed, III, Los Angeles, CA (US); William Quinn Oscar Shelton, III, Los Angeles, CA (US); Michael Dave Finn, New York, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 18/118,984

(22) Filed: Mar. 8, 2023

(65) Prior Publication Data
US 2024/0042326 A1 Feb. 8, 2024

Related U.S. Application Data (63) Continuation of application No. 17/125,781, filed on Dec. 17, 2020, now abandoned.

(60) Provisional application No. 62/950,882, filed on Dec. 19, 2019.

(51) Int. Cl.
A63F 13/69 (2014.01)
A63F 13/213 (2014.01)

(52) U.S. Cl.
CPC ............ *A63F 13/69* (2014.09); *A63F 13/213* (2014.09)

(58) Field of Classification Search
None
See application file for complete search history.

(56) References Cited

U.S. PATENT DOCUMENTS

| | | | |
|---|---|---|---|
| 8,882,595 B2* | 11/2014 | Chowdhary | A63F 13/213 463/43 |
| 9,220,985 B1* | 12/2015 | Auterio | A63F 13/27 |
| 11,562,376 B2* | 1/2023 | Chen | G06K 7/10297 |
| 2003/0014423 A1* | 1/2003 | Chuah | G06F 16/958 707/999.102 |
| 2008/0163055 A1* | 7/2008 | Ganz | G06Q 30/0643 715/706 |
| 2009/0143141 A1* | 6/2009 | Wells | G07F 17/3239 463/37 |
| 2012/0132701 A1* | 5/2012 | Nakagawa | G06Q 30/02 235/375 |
| 2012/0276997 A1* | 11/2012 | Chowdhary | A63F 13/65 463/31 |
| 2012/0295703 A1* | 11/2012 | Reiche | A63F 13/235 463/31 |
| 2013/0005466 A1* | 1/2013 | Mahajan | A63F 13/65 463/36 |
| 2013/0005475 A1* | 1/2013 | Mahajan | A63F 13/85 463/42 |

(Continued)

Primary Examiner — Seng H Lim
(74) Attorney, Agent, or Firm — RAY QUINNEY & NEBEKER P.C.; John O. Carpenter (57) ABSTRACT Facets of a video game are modified based on scanning of bar codes. The bar codes may be bar codes of retail products. The facets of the video game may one or more of availability of game characters for use in play of the video game, characteristics of the game characters, availability or characteristics of in-game items, or game player status.

18 Claims, 6 Drawing Sheets (56) References Cited

U.S. PATENT DOCUMENTS

| | | | |
|---|---|---|---|
| 2013/0005480 A1* | 1/2013 | Bethke | A63F 13/798 |
| | | | 463/43 |
| 2014/0252077 A1* | 9/2014 | Corby | G06K 5/00 |
| | | | 235/375 |
| 2014/0274313 A1* | 9/2014 | Bala | G06Q 30/06 |
| | | | 463/25 |
| 2015/0087427 A1* | 3/2015 | Wane | A63F 13/71 |
| | | | 463/43 |
| 2016/0361631 A1* | 12/2016 | Linden | A63F 13/25 |
| 2017/0163957 A1* | 6/2017 | Anderson | G06T 19/00 |
| 2018/0047032 A1* | 2/2018 | Wu | G06Q 30/0185 |
| 2021/0090394 A1* | 3/2021 | Russ | G07F 17/3209 |
| 2022/0084047 A1* | 3/2022 | Chen | G06K 7/10297 |

* cited by examiner

VIDEO GAME WITH REAL WORLD SCANNING ASPECTS

CROSS REFERENCE TO RELATED APPLICATIONS

This application is a continuation of U.S. patent application Ser. No. 17/125,781, filed on Dec. 17, 2020, which claims the benefit of the filing date of U.S. Provisional Patent Application No. 62/950,882, filed on Dec. 19, 2019, the disclosures of each of which are incorporated by reference herein.

BACKGROUND OF THE INVENTION

The present invention relates generally to video games, and more particularly to video games providing for real world interaction.

Video games provide a source of entertainment for many. Video games often provide an interactive activity that can be interesting and challenging, and may allow game players to engage in simulated activities that may otherwise be unavailable. This simulated activity is generally provided by way of a compute device, whether a general computer, game console, or portable electronic device with a processor, for example a smartphone. Unfortunately, the use of such equipment may lack interaction with the broader physical world.

BRIEF SUMMARY OF THE INVENTION

Some embodiments provide video game play benefits for scanning of real world bar codes. In some embodiments game players may unlock access to game characters, obtain points, modify game character abilities, and/or obtain useful or interesting items for use in video game play by scanning bar codes. In some embodiments the bar codes are real world bar codes of retail products, in some embodiments the bar codes are real world bar codes provided specifically for use with respect to the video game, and in some embodiments the bar codes are both. In some embodiments a game player may use a smartphone to scan one or more bar codes, resulting in unlocking playable game characters or abilities of those game characters, obtain points for use in the video game, and/or obtain in-game items. In some embodiments, available game characters, their characteristics, including their abilities, point levels of a game player, and in-game items may all be considered facets of video game play.

Some embodiments provide a method for providing video game play benefits for scanning of bar codes, comprising: receiving information of a bar code; determining a modification to a facet of a video game associated with at least some of the information of the bar code; modifying the facet of the video game with the determined modification; and providing for play of the video game. In some embodiments the facet of the video game is availability of at least one video game character for control by a game player. In some embodiments the facet of the video game is availability of at least one in-game item for use in play of the video game. In some embodiments the facet of the video game is a characteristic of at least one video game character. In some embodiments the facet of the video game is a characteristic of at least one in-game item for use in play of the video game.

Some embodiments provide a non-transitory computer readable memory storing program instructions, the program instructions comprising program instructions to configure at least one processor to: receive information of a bar code; determine a modification to a facet of a video game associated with at least some of the information of the bar code; modify the facet of the video game with the determined modification; and provide for play of the video game.

These and other aspects of the invention are more fully comprehended upon review of this disclosure.

DETAILED DESCRIPTION

Figure 1:
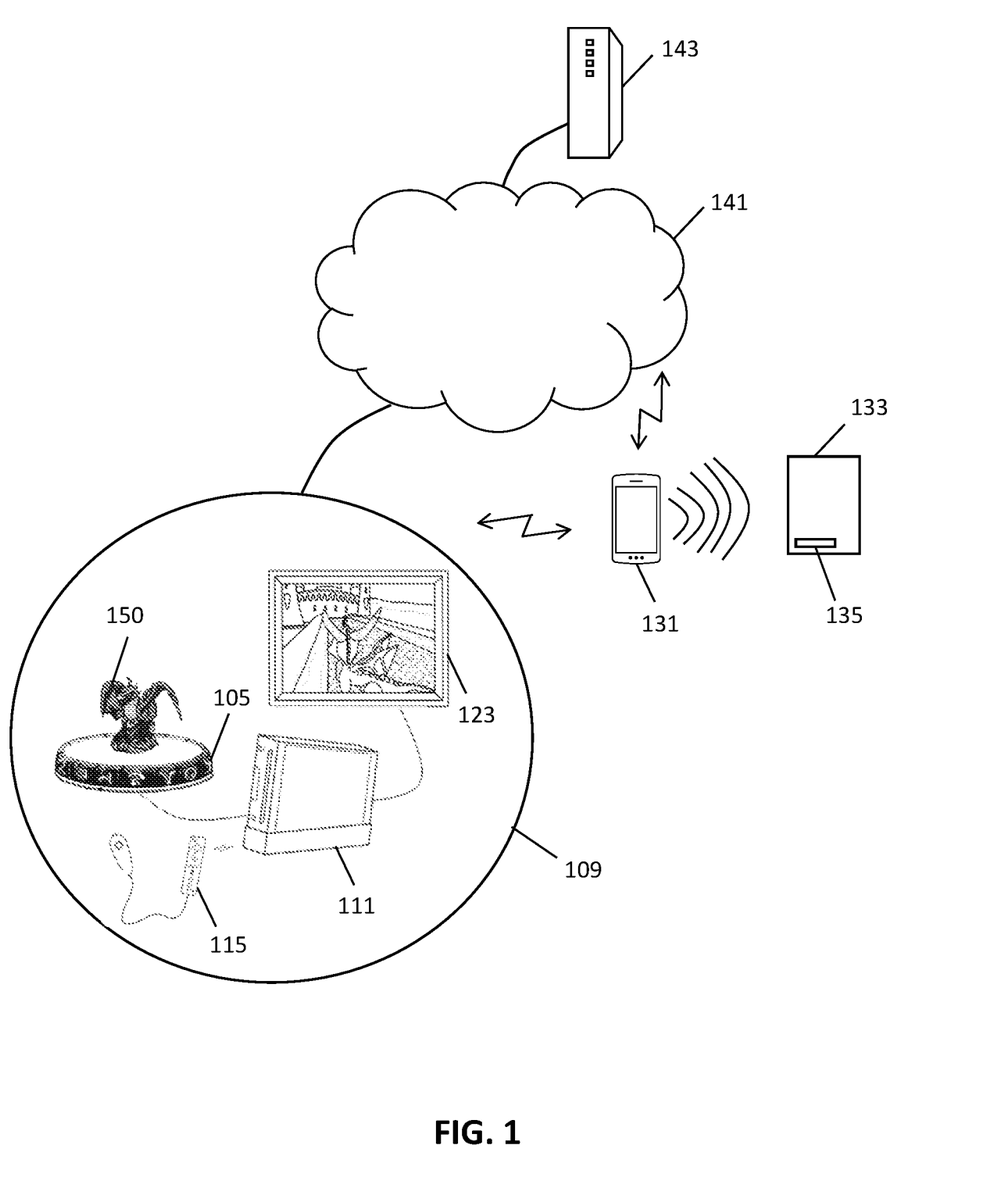
FIG. 1 is a semi-block diagram of a networked system, with a portable electronic device proximate an item with a bar code, in accordance with aspects of the invention.

FIG. 1 is a semi-block diagram of a networked system, with a portable electronic device proximate an item with a bar code, in accordance with aspects of the invention. FIG. 1 shows a portable electronic device 131 scanning a bar code 135 on a package 133. The portable electronic device includes one or more processors, one or more user input devices, and an imaging device, for example a camera. The imaging device may be used in scanning of the bar code. In many embodiments the portable electronic device also includes a display, and in many embodiments communication circuitry, for example cellular and/or WiFi communication circuitry, and in some embodiments position location circuitry, for example GPS circuitry. In many embodiments the portable electronic device is a smartphone. In some embodiments the bar codes are one-dimensional bar codes. In some embodiments the bar codes are two-dimensional or matrix bar codes, for example a QR code or some other two-dimensional or matrix bar code. In some embodiments the bar codes are three-dimensional bar codes. In some embodiments the bar codes are bar codes on retail packages. In some embodiments the bar codes are in a UPC and/or EAN format. In some embodiments the bar codes are bar codes in compliance with an EAN standard (for example EAN-8 and/or EAN-13 or 14) and/or a GTIN standard (for example GTIN, GTIN-12, GTIN-13, and/or GTIN-14). In some embodiments the bar codes are bar codes on items provided within a retail package. For example, in some embodiments the bar codes may be provided on a substrate, for example a piece of paper or laminate, within another retail package, for example a retail package for a product for or related to the video game, or some other product. In some embodiments the bar codes are bar codes on items provided separate from a retail package, for example on advertising or marketing displays, which may in some embodiments be presented on the display of an electronic device.

In some embodiments the portable electronic device is configured for play of a video game by a game player. For example, in some embodiments a processor of the portable electronic device, responsive to inputs from the user input devices, may command display on the device's display of a game player controlled game character, controlled based on the inputs from the user input device, in and interacting with a virtual world of game play. In some embodiments various facets of play of the video game are dependent on the scanning of bar codes by the portable electronic device. In some embodiments a plurality of game characters potentially may be available for game player control, with actual availability for at least one or more of the plurality of game players dependent on scanning of bar codes by the portable electronic device of the game player. In some embodiments in-game items may also be available for use in game play by game characters controlled by a game player, again with such availability dependent on scanning of bar codes by the portable electronic device. In some embodiments characteristics of game characters and/or in-game items may be modified, for example also based on scanning of bar codes by the portable electronic device. In some embodiments levels, maps, areas, modes, or features of the video game may be made available dependent on scanning to bar codes by the portable electronic device.

In some embodiments the portable electronic device may scan the bar code, and determine a modification to a facet of game play based on the scanned bar code. In some embodiments the portable electronic device may instead or in addition provide information of the scanned bar code over a network 141 to a server 143. In such embodiments, the server may determine the modification to a facet of game play based on the information of the scanned bar code, and provide information as to the modification to the facet of game play to the portable electronic device information.

In some embodiments play of the video game may instead or in addition occur using a compute device other than the personal electronic device. For example, in some embodiments play of the video game may occur using a video game system 109. The use of the video game system 109 for play of the video game is optional in some embodiments, not provided in some embodiments, and required in some embodiments. In some embodiments the video game system includes a game console 111 with a processor for executing program instructions providing for game play and associated circuitry, user input devices such as a game controller 115, and a display device 123 for displaying game action. Some video game systems may also optionally include a peripheral device 105, and a toy 150, which in various embodiments includes a rewritable or read-only memory.

As with the portable electronic device, the processor of the game console 111, responsive to inputs from the user input devices may command display on the display device of one or more game characters in and interacting with the virtual world of game play. The game console may also receive bar code scan information or information as to a modification to a facet of game play based on bar code scan information from the portable electronic device. In some embodiments the game console may receive the information by way of a network, for example network 141. In some embodiments the game console may receive the information as to a modification to a facet of game play based on bar code scan information from a server, for example the server 143. In such embodiments the server may determine the modification to a facet of game play based on bar code scan information from a portable electronic device.

In some embodiments the optional peripheral device 105 may also provide the capability to read and write information to the toy 150. The toy 150 may include machine-readable/writable information, for example, memory or a radio frequency identification (RFID) tag, which includes information regarding one or more game characters. In some embodiments one or more aspects of the functionality of the optional peripheral device 105 may be present in the game console 111. In some embodiments the toy 150 may include one or more wireless communication devices such as an RFID device, a near-field communication (NFC) device, a Bluetooth device, or any other wireless communication device that allows the toy 150 to send/receive information to/from the optional peripheral device 105 or game console 111. In some embodiments the processor may include characters in game play based on inputs from the peripheral device 105. In some embodiments, the inclusion of such characters in game play may be in addition to allowing inclusion of game characters in game play based on scanning of one or more bar codes by a portable electronic device.

Figure 2:
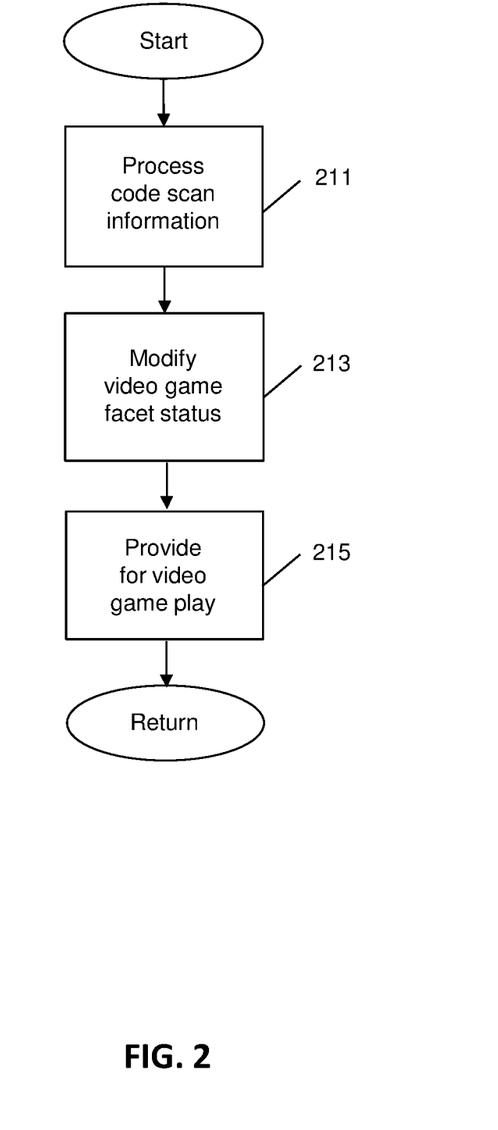
FIG. 2 is a flow diagram of a process for providing video game play benefits for scanning of real world bar codes, in accordance with aspects of the invention.

FIG. 2 is a flow diagram of a process for providing video game play benefits for scanning of real world bar codes, in accordance with aspects of the invention. In some embodiments the process of FIG. 2 is performed by a system, for example the system of FIG. 1. In some embodiments the process is performed by one or more portable electronic devices, for example one or more of the portable electronic devices of FIG. 1. In some embodiments the process is performed by a smartphone. In some embodiments the process is performed by a smartphone and a server. In some embodiments the process is performed by a smartphone and a video game system. In some embodiments the process is performed by a smartphone, a video game system, and a server. In some embodiments the process is performed by one or more processors configured by program instructions.

In block 211 the process processes bar code scan information. In some embodiments the process correlates a number associated with a bar code with a modification to a facet of a video game. In some embodiments the facet of the video game is availability of a game character for use by a game player in video game play. In some embodiments the facet of the video game is one or more characteristics of a game character controlled by the game player. In some embodiments the facet of the video game is availability of an in-game item, or a modification of one or more characteristics of the in-game item. In some embodiments the facet of the video game is a number of points of or for the game player. In some embodiments the facet of the video game is the availability of one or more levels, maps, areas, modes, or features of the video game.

In some embodiments the bar code scan information is information of a bar code. In some embodiments the obtained bar code scan information is a value, for example a number. In some embodiments the bar code scan information uniquely indicates a manufacturer and a product. In some embodiments the bar code is in the form of a Universal Product Code (UPC), an International Article Number (IAN), or a European Article Number (EAN). In some embodiments the bar code scan information may or may not indicate manufacturer and a product, but may indicate a value having significance to a process determining video game play benefits for scanning of bar codes.

In some embodiments the bar code scan information is obtained by obtaining image information of a bar code and processing the image information to obtain the bar code scan information. In some embodiments the image information is obtained by an imaging device of a portable electronic device, which in some embodiments may be a camera of a smartphone. In some embodiments the camera forms an image of a bar code on a retail product and/or packaging or a tag for a retail product. In some embodiments the camera forms an image of a bar code on a substrate, which may be provided within a retail product or otherwise. For example, in some embodiments the camera forms an image of a bar code on a piece of paper or laminate, with the piece of paper or laminate provided with some good related to the video game.

In some embodiments a processor of the portable electronic device executes program instructions to analyze the image information to determine the value, for example the number, represented by the bar code. In some embodiments the portable electronic device transmits information of the image to a server, and the server determines the value represented by the bar code. In some embodiments the server transmits an indication of the value represented by the bar code to the portable electronic device. In some embodiments the server transmits the indication of the value represented by the bar code to a video game system.

In some embodiments the process uses the value represented by the bar code to determine a modification to a facet of a video game. In some embodiments the portable electronic device determines the modification, in some embodiments the server determines the modification. In some embodiments indications of a plurality of possible modifications are stored in memory. In some embodiments the value represented by the bar code is used in selecting one or more of the possible modifications. In some embodiments the value represented by the bar code may be used an index or pointer to a lookup table or other data structure, or be used in generating the index or pointer. In some embodiments only part of the value represented by the bar code may be used as the index or pointer, or be used in generating the index or pointer. For example, in some embodiments, only portions of the value indicative of a company identifier may be so used, and, in some embodiments, only portions of the value indicative of a product may be so used.

In some embodiments different values represented by the bar code may result in selection of different ones of the possible modifications For example, a value of 047875877542 may result in selection of a first particular modification, while a value of 047875877543 may result in selection of a second particular modification.

In some embodiments different values represented by the bar code may result in selection of different ones of the possible modifications, while other values may all result in selection of a single possible modification. For example, a value of 047875877542 may result in selection of a first particular modification, a value of 047875877543 may result in selection of a second particular modification, while a value of any of 047875877544, 047875877545, or 047875877547 may all result in selection of a third particular modification. In some embodiments some values may result in selection of a default possible modification, and in some embodiments some values may result in selection of no modification at all.

In some embodiments the process queries a database to determine an aspect associated with the bar code, such as a manufacturer, product, country of origin, date of manufacture, or any other aspect associated with the bar code. In some embodiments the portable electronic device or the server may query another server, which may maintain or have access to information correlating bar code values with aspects such as manufactures and/or products, in order to determine the manufacturer and/or product associated with the bar code. In some embodiments the process may select a possible modification based on an identity of a manufacturer and a product returned by the other server in response to the query. In some embodiments the process may select a possible modification based on an identity of a manufacturer returned by the other server in response to the query. In some embodiments the process may select a possible modification based on an identity of a product returned by the other server in response to the query. In some embodiments the process may select a possible modification based on some other aspect or aspects associated with the bar codes.

In block 213 the process modifies a facet of a video game. In some embodiments the modified facet of the video game is availability of at least one video game character for control by a game player. For example, in some embodiments a plurality of game characters potentially may be selected by a game player for use in play of the video game, with the game characters actually available for selection limited to those "unlocked" for game play. The unlocking of game characters, or at least some of them, may be based on scanning of bar codes by the game player, for example using the gameplayer's smartphone. In some embodiments the modified facet of the video game is availability of at least one in-game item for use in play of the video game. For example, in some embodiments a particular in-game item, for example a tool, weapon, or accoutrement, may be available for use by a game character controlled by a game player based on scanning of bar codes by the game player. Also for example, in some embodiments a number of points or tokens available for use by the game player during game play may be increased. In some embodiments the modified facet of the video game is a characteristic of at least one video game character. For example, in some embodiments a health value, a strength value, or some other characteristic may be increased (or decreased) based on scanning of bar codes by the game player. In some embodiments the modified facet of the video game is a characteristic of at least one in-game item for use in play of the video game. For example, in some embodiments the in-game item may be provided a new or enhanced capability. In some embodiments the modified facet of the video game is the availability of one or more levels, maps, areas, modes, or features of the video game.

In block 215 the process provides for play of the video game, with the facet of the video game modified as discussed with respect to block 213 (noting that in some embodiments the facet of the video game so modified by may be further modified as part of play of the video game. In some embodiments the process presents a game player controlled game character, or a view from a viewpoint of a game player controlled game character, with the game character controlled based on the inputs from the user input device, in and interacting with a virtual world of game play. In some embodiments the process provides the presentation on a display of a portable electronic device. In some embodiments the process provides the presentation on a display of a video game system.

The process thereafter returns.

Figure 3:
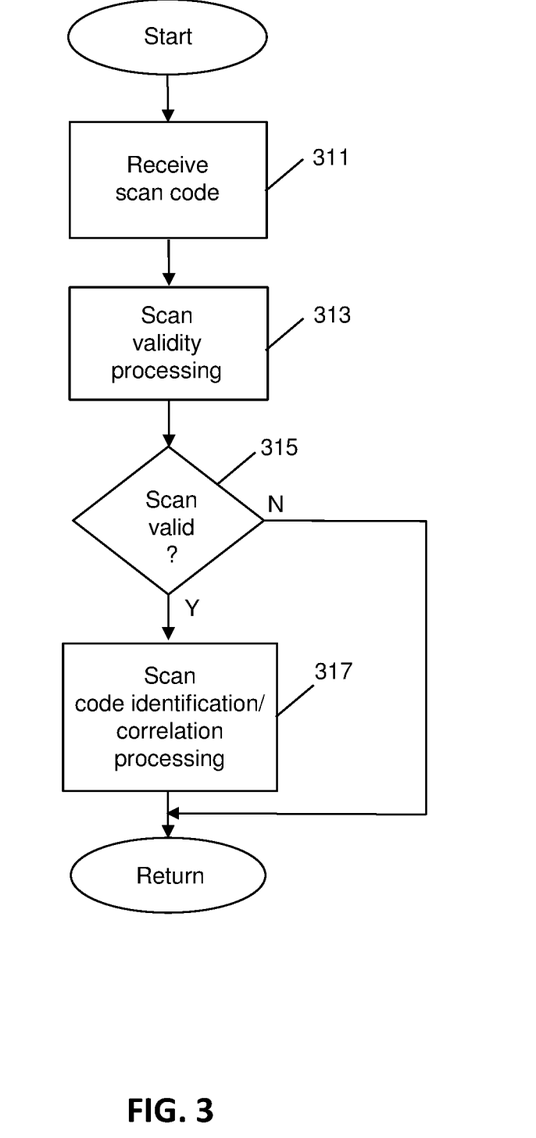
FIG. 3 is a flow diagram of a process for processing information of a scan of a bar code, in accordance with aspects of the invention.

FIG. 3 is a flow diagram of a process for processing information of a scan of a bar code, in accordance with aspects of the invention. In some embodiments the process of FIG. 3 is performed by a system, for example the system of FIG. 1. In some embodiments the process is performed by one or more portable electronic devices, for example one or more of the portable electronic devices of FIG. 1. In some embodiments the process is performed by a smartphone. In some embodiments the process is performed by a smartphone and a server. In some embodiments the process is performed by a smartphone and a video game system. In some embodiments the process is performed by a smartphone, a video game system, and a server. In some embodiments the process is performed by one or more processors configured by program instructions. In some embodiments the process performs operations of block 211 of the process of FIG. 2.

In block 311 the process receives a value indicating information of a bar code scan. In some embodiments a bar code is scanned and a value, for example a numeric value, is obtained and provided to the process. In some embodiments a bar code is scanned by way of taking an image of the bar code with an imaging device, for example a camera of a smartphone, and executing program instructions for determining values (e.g. bar code numbers) for imaged bar codes. There are a number of software applications ("apps") available for smartphone that provide such functions. Some embodiments may make use of such apps, while some embodiments may implement such functions directly.

In optional block 313 the process performs scan validity processing. In some embodiments the process determines that a bar code scan is valid, e.g. may be used, if certain criteria are met, or, alternatively, that certain criteria have not been met. In some embodiments the bar code scan is considered valid if the bar code has not been scanned before by the game player. In some embodiments the bar code scan is considered valid if the bar code has not been scanned by the game player within an immediately preceding predetermined period of time, for example 30 seconds. In some embodiments the bar code is considered valid if the bar code has been scanned while the smartphone is within a predetermined geographic area, for example as indicated by GPS circuitry of the smartphone.

In optional block 315 (performed if block 313 is performed) the process determines if the bar code scan is valid, for example as discussed with respect to block 313. If the scan is not valid, the process returns. Otherwise the process continues to block 317.

In block 317 the process determines a modification to a facet of a video game associated with the information of the bar code scan, e.g. the bar code number. In some embodiments determines the modification to the facet of the video by querying a database, table, list, or other data structure correlating bar code numbers with modifications to facets of the video game. In some embodiments the process queries a first database, table, list, or other data structure correlating bar code numbers with modifications to facets of the video game, and if the query provides no results, queries a second database, table, list, or other data structure correlating bar code numbers, or portions thereof, with manufacturers and/or products associated with the bar code numbers. In some embodiments the process uses information regarding the manufacturers and/or products to determine the modification to the facet of the video game.

The process thereafter returns.

Figure 4:
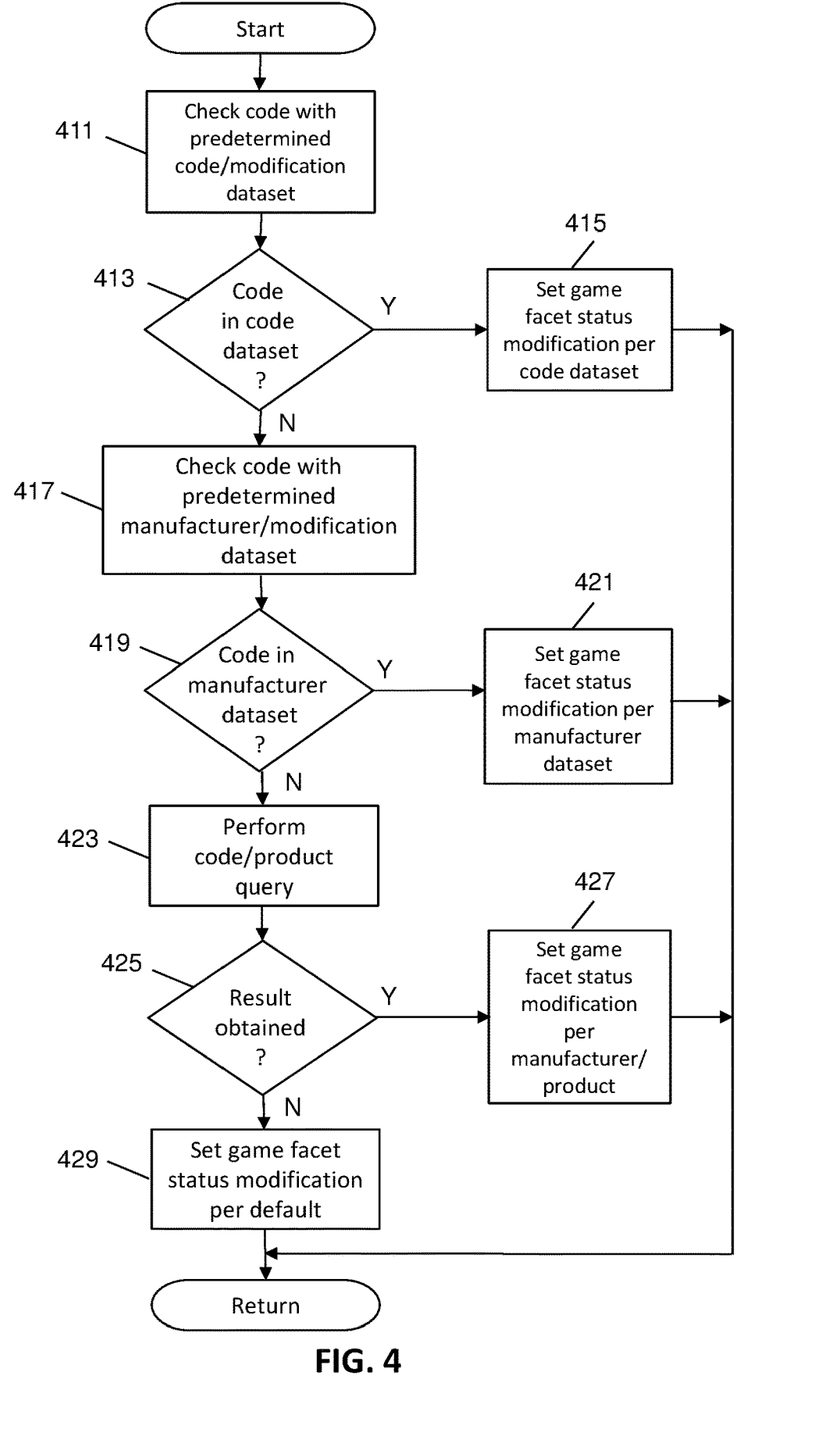
FIG. 4 is a flow diagram of a process for correlating a bar code with a modification of a facet of video game play, in accordance with aspects of the invention.

FIG. 4 is a flow diagram of a process for correlating a bar code with a modification of a facet of video game play, in accordance with aspects of the invention. In some embodiments the process of FIG. 4 is performed by a system, for example the system of FIG. 1. In some embodiments the process is performed by one or more portable electronic devices, for example one or more portable electronic devices of FIG. 1. In some embodiments the process is performed by a smartphone. In some embodiments the process is performed by a smartphone and a server. In some embodiments the process is performed by a smartphone, a video game system, and a server. In some embodiments the process is performed by one or more processors configured by program instructions. In some embodiments the process performs operations of block 211 of the process of FIG. 2. In some embodiments the process performs operations of block 317 of the process of FIG. 3.

In block 411 the process checks a value of a scanned bar code with a dataset correlating predetermined bar code values with modifications to facets of a video game. The dataset correlating predetermined bar code values with modifications to facets of the video game may be considered a code dataset in some embodiments. In some embodiments the code dataset is in the form of an index or a lookup table or other data structure. In some embodiments the code dataset correlates different values for the scanned bar code with different modifications to facets of the video game. For example, in some embodiments a value of 047875877542 may be correlated with a first particular modification, while a value of 047875877543 may be correlated with a second particular modification. In some embodiments the code dataset may correlate some different values for the scanned bar code with the same modification. For example, in some embodiments a value of 047875877542 and value of 047875877543 may be both correlated with a first particular modification, while a value of 047875877551 may be correlated with a second particular modification. In some embodiments a value of 047875877542 may, at different times or under different circumstances, be correlated with different particular modifications. In some embodiments the value of the scanned bar code indicates a manufacturer and a product. In some embodiments the value of the scanned bar code may or may not indicate manufacturer and a product but may indicate a value having significance to a process determining video game play benefits for scanning barcodes. In some embodiments the code dataset is accessed in a portable electronic device or a smartphone memory. In some embodiments the code dataset is accessed on a video game server or a server associated with the video game. In some embodiments the code dataset is accessed on a third-party server or a plurality of third-party servers. In some embodiments code dataset is updated periodically.

In some embodiments the player of the video game may be prompted or instructed to scan certain bar codes or bar codes associated with certain products or advertising or marketing displays. In some embodiments the player may receive the prompt or instruction from within the video game. In some embodiments the player may receive the prompt or instruction outside of the video game, for example from a website or social media site associated with the video game or a particular product. In some embodiments the prompt or instruction may have an associated time limit for scanning the particular bar code(s) or bar code(s) associated with certain products or advertising, for example, some number or hours, days, weeks, or months.

In block 413, the process determines whether the value of the scanned bar code is found in the dataset correlating predetermined bar code values with modifications to facets of the video game. In some embodiments the value of the scanned bar code is considered to be found in the code dataset if the value of the scanned bar code is associated in the dataset with at least one modification to a facet of the video game. In some embodiments the value of the scanned bar code is in addition or instead considered to be found in the code dataset if at least a predetermined number of consecutive digits, letters, or symbols of the value of the scanned bar code is associated in the code dataset with at least one modification to a facet of the video game. If the value of the scanned bar code is found in the code dataset, the process continues to block 415. Otherwise the process continues to block 417.

In block 415, the process sets a game facet modification, or selects a modification to a facet of the video game, as indicated by the code dataset. In some embodiments the selection of the modification is dependent on the value of the scanned bar code. In some embodiments the value of the scanned bar code is used in selecting one of the plurality of possible modifications. In some embodiments the value of the scanned bar code is used as a pointer into the code dataset. In some embodiments the value of the scanned bar code is used in generating a pointer into the code dataset. In some embodiments the pointer is used to select a record, indicating the modification, in the code dataset.

In some embodiments the modification is a virtual reward aiding in advancing in the video game. In some embodiments the virtual reward is triggered by the scanned bar code. In some embodiments the virtual reward is assigned randomly, for example at a time of accessing the code dataset. In some embodiments there is a virtual reward tier system having a plurality of tiers based on a virtual worth of the virtual reward in the video game. In such embodiments the virtual reward from one of the plurality of tiers may be determined at a time of accessing the code dataset. In some embodiments the virtual reward is virtual points for leveling up stats of or unlocking virtual items or skins for virtual video game characters. In some embodiments the reward is unlocking virtual items or skins. In some embodiments the reward is unlocking virtual items or skins that are virtual renderings or virtual derivatives of real-world products or objects by scanning bar codes of the real-world products or objects that match the at least one bar code data point in the predetermined bar code dataset. In some embodiments the reward is unlocking one of a plurality of virtual video game characters. In some embodiments the reward is related to an attribute of a manufacturer or a manufacturer's good for which the at least one bar code data point from the predetermined bar code dataset is scanned. For example, scanning a water bottle's barcode found in the predetermined bar code data set may trigger a reward in the form of virtual points for leveling up virtual game characters with water-based powers. In some embodiments the reward is related to an attribute of a predetermined real-world location or area where the bar code from the predetermined bar code dataset is scanned. For example, scanning the at least one bar code data point from the predetermined bar code dataset at a beach may trigger the reward in the form of virtual points for leveling up virtual game characters with water-based powers.

Thereafter, the process returns.

In block 417, the process checks a portion of a value of a scanned bar code with a dataset correlating predetermined portions of bar code values with modifications to facets of a video game. In some embodiments the predetermined portions of the bar codes may indicate a manufacturer of a product. The dataset correlating predetermined portions of bar code values with modifications to facets of the video game may be considered a manufacturer dataset in some embodiments. In some embodiments the manufacturer dataset is in the form of an index or a lookup table or other data structure. In some embodiments the manufacturer dataset correlates different values for the portions of scanned bar code with different modifications to facets of the video game. For example, in some embodiments a value of 047875 may be correlated with a first particular modification, while a different value may be correlated with a second particular modification. In some embodiments the manufacturer dataset may correlate some different values for the scanned bar code with the same modification. For example, in some embodiments a value of 047875 and a first different value may be both correlated with a first particular modification, while a value of second different value may be correlated with a second particular modification. In some embodiments a value of 047875 may, at different times or under different circumstances, be correlated with different particular modifications. In some embodiments the manufacturer dataset is accessed in a portable electronic device or a smartphone memory. In some embodiments the manufacturer dataset is accessed on a video game server or a server associated with the video game. In some embodiments the manufacturer dataset is accessed on a third-party server or a plurality of third-party servers. In some embodiments manufacturer dataset is updated periodically.

In block 419, the process determines whether the portion of the value of the scanned bar code is found in the dataset correlating predetermined portions of bar code values with modifications to facets of the video game. In some embodiments the value of the portion of the scanned bar code is considered to be found in the manufacturer dataset if the portion of the value of the scanned bar code is associated in the dataset with at least one modification to a facet of the video game. In some embodiments the portion of the value of the scanned bar code is in addition or instead considered to be found in the manufacturer dataset if at least a predetermined number of consecutive digits, letters, or symbols of the value of the scanned bar code is associated in the manufacturer dataset with at least one modification to a facet of the video game. If the value of the scanned bar code is found in the manufacturer dataset, the process continues to block 421. Otherwise the process continues to block 423.

In block 421, the process sets a game facet modification, or selects a modification to a facet of the video game, as indicated by the manufacturer dataset. In some embodiments the selection of the modification is dependent on the portion of the value of the scanned bar code. In some embodiments the portion of the value of the scanned bar code is used in selecting one of the plurality of possible modifications. In some embodiments the portion of the value of the scanned bar code is used as a pointer into the manufacturer dataset. In some embodiments the portion of the value of the scanned bar code is used in generating a pointer into the manufacturer dataset. In some embodiments the pointer is used to select a record, indicating the modification, in the manufacturer dataset.

In some embodiments the modification is a virtual reward aiding in advancing in the video game. In some embodiments the virtual reward is triggered by the scanned bar code. In some embodiments the virtual reward is assigned randomly, for example at a time of accessing the manufacturer dataset. In some embodiments there is a virtual reward tier system having a plurality of tiers based on a virtual worth of the virtual reward in the video game. In such embodiments the virtual reward from one of the plurality of tiers may be determined at a time of accessing the manufacturer dataset. In some embodiments the virtual reward is virtual points for leveling up stats of or unlocking virtual items or skins for virtual video game characters. In some embodiments the reward is unlocking virtual items or skins. In some embodiments the reward is unlocking virtual items or skins that are virtual renderings or virtual derivatives of real-world products or objects by scanning bar codes of the real-world products or objects that match the at least one bar code data point in the manufacturer dataset. In some embodiments the reward is unlocking one of a plurality of virtual video game characters. In some embodiments the reward is related to an attribute of a manufacturer or a manufacturer's goods. For example, scanning a water bottle's barcode found in the predetermined bar code data set may trigger a reward in the form of virtual points for leveling up virtual game characters with water-based powers. In some embodiments the reward is related to an attribute of a predetermined real-world location or area where the bar code from the predetermined bar code dataset is scanned. For example, scanning the at least one bar code data point from the predetermined bar code dataset at a beach may trigger the reward in the form of virtual points for leveling up virtual game characters with water-based powers.

Thereafter, the process returns.

In block 423, the process performs a code or product query for the scanned bar code. In some embodiments the query provides the value of the scanned bar code to a server having access bar code value information. In some embodiments the server returns information as to a manufacturer and, in some embodiments, a product associated with the value of the scanned bar code.

In block 425, the process determines whether query for the value of the scanned bar code provides a result indicating a manufacturer and, in some embodiments, a product. If so, the process continues to block 427. Otherwise the process continues to block 429.

In block 427, the process sets a game facet modification, or selects a modification to a facet of the video game, based on information regarding the manufacturer and, in some embodiments, the product returned by the query. In some embodiments the portable electronic device determines the modification, and in some embodiments a server determines the modification. In some embodiments the modification is as discussed with respect to the modifications indicated by the code dataset and/or manufacture dataset.

Thereafter, the process returns.

In block 429, the process sets a game facet modification, or selects a modification to a facet of the video game to a default modification. In some embodiments the default is a default virtual reward. In some embodiments the default virtual reward has lesser virtual worth than the virtual rewards indicated by the code dataset and/or manufacturer dataset. In some embodiments the default virtual reward is a predetermined number of points usable in the video game. In some embodiments the default virtual reward is no reward.

Thereafter, the process returns.

Figure 5:
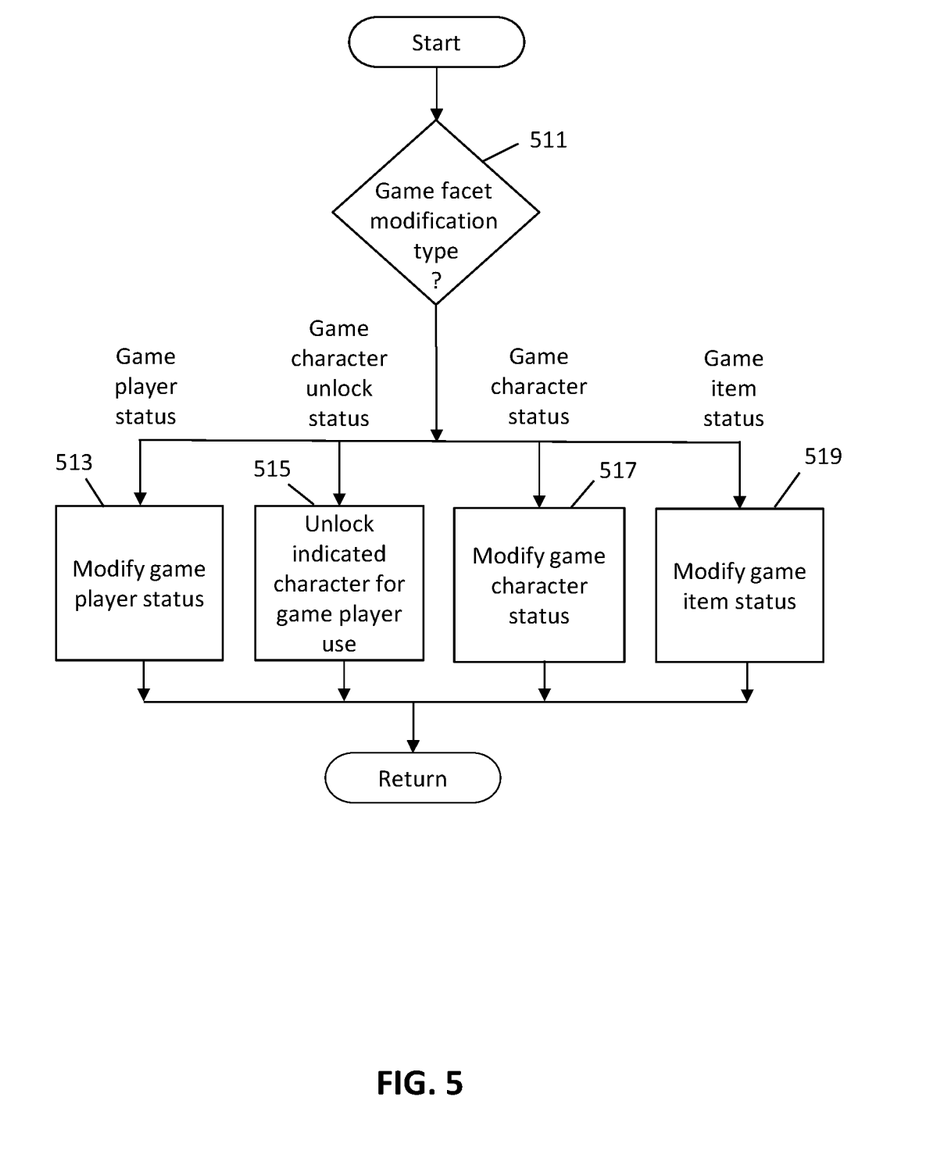
FIG. 5 is a flow diagram of a process for modifying a facet of video game play, in accordance with aspects of the invention.

FIG. 5 is a flow diagram of a process for modifying a facet of video game play, in accordance with aspects of the invention. In some embodiments the process of FIG. 5 is performed by a system, for example the system of FIG. 1. In some embodiments the process is performed by one or more portable electronic devices, for example one or more portable electronic devices of FIG. 1. In some embodiments the process is performed by a smartphone. In some embodiments the process is performed by a smartphone and a server. In some embodiments the process is performed by a smartphone, a video game system, and a server. In some embodiments the process is performed by one or more processors configured by program instructions. In some embodiments the process performs operations of block 213 of the process of FIG. 2.

In block 511 the process determines a game facet modification type. In some embodiments, modifications of facets of game play may be one of a modification to game player status, a modification to game character availability for play status, a modification to game character status, or a modification to an in-game item status. In some embodiments the process determines the game facet modification type based on information of a selected modification of a facet of video game play. In some embodiments other game facet modification types may be included. In some embodiments operations of block 511 are optional.

If the game facet modification type indicates a modification to game player status, in block 513 the process modifies a game player status. In most embodiments the process modifies the game player status of the game player who, through the scanning of bar codes, initiated the modification of game player status. In some embodiments the process modifies the game player status by making additional points available to the game player, for example to use during game play to modify game character and/or game item status.

If the game facet modification type indicates a modification to game character availability for play status, in block 515 the process makes a game character available for play by one or more game players. In some embodiments the process makes the game character available for play by a game player who, through the scanning of bar codes initiated the making of the game character available for play. In some embodiments the process additionally or instead makes the game character available for play by a game player designated by the game player who, through the scanning of bar codes initiated the making of the game character available for play. In some embodiments the process additionally or instead makes the game character available for play by a group of game players on a same team as the game player who, through the scanning of bar codes initiated the making of the game character available for play.

If the game facet modification type indicates a modification to game character status, in block 517 the process modifies a game character status. In most embodiments the process modifies the game character status of a game character controlled by the game player who, through the scanning of bar codes, initiated the modification of game character status. In some embodiments the process modifies the game character status by increasing one or more of a health, strength, or other characteristic of the game character. In some embodiments the process modifies the game character status by modifying an elemental type of the game character, for example making the game character a game character of a fire element, a water element, or some other element. In some embodiments the process modifies the game character status by providing the game character a new or improved capability.

If the game facet modification type indicates a modification to game item status, in block 519 the process modifies a game item status. In most embodiments the process modifies the game item status of a game item used by, or made available for use by, a game character controlled by the game player who, through the scanning of bar codes, initiated the modification of game character status. In some embodiments the process modifies the game item status by making the game item available for use by a game character. In some embodiments the process modifies the game item status by increasing a capability of the game item. In some embodiments the process modifies the game item status by providing the game item a new capability.

The process thereafter returns.

Figure 6:
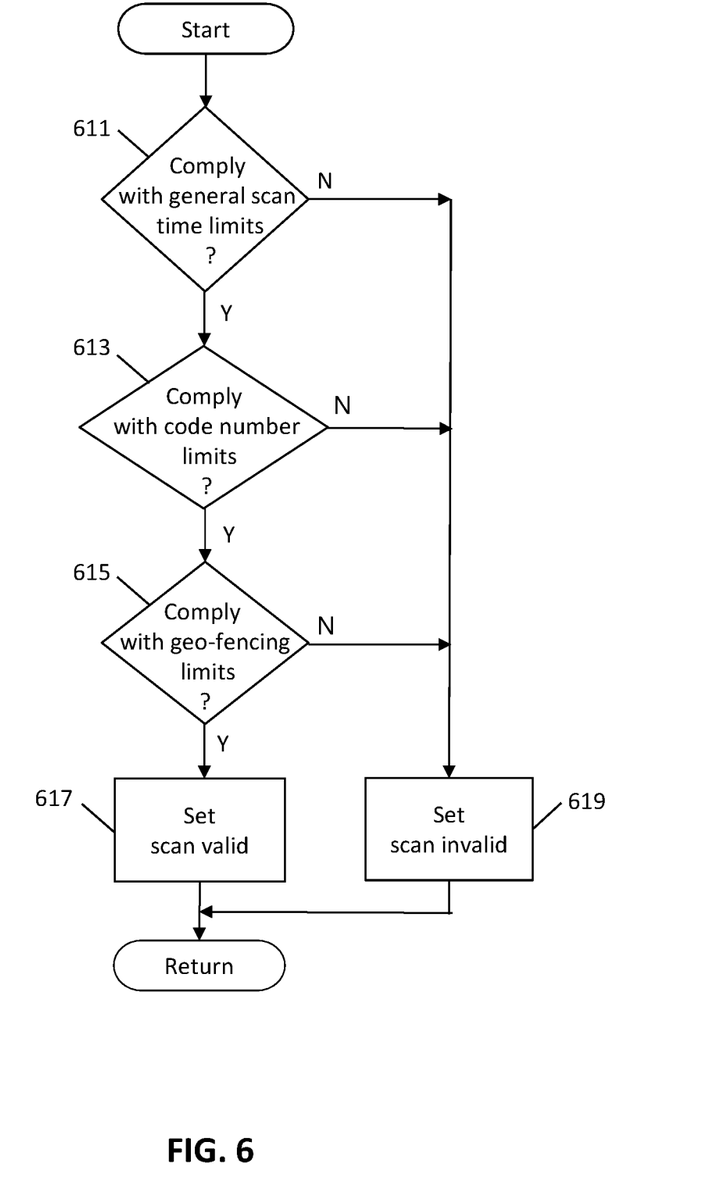
FIG. 6 is a flow diagram of a process for determining if a bar code scan may be used to provide video game play benefits, in accordance with aspects of the invention.

FIG. 6 is a flow diagram of a process for determining if a bar code scan may be used to provide video game play benefits, in accordance with aspects of the invention. In some embodiments the process of FIG. 6 is performed by a system, for example the system of FIG. 1. In some embodiments the process is performed by one or more portable electronic devices, for example one or more portable electronic devices of FIG. 1. In some embodiments the process is performed by a smartphone. In some embodiments the process is performed by a smartphone and a server. In some embodiments the process is performed by a smartphone, a video game system, and a server. In some embodiments the process is performed by one or more processors configured by program instructions. In some embodiments the process performs operations of block 313 of the process of FIG. 3.

In block 611, the process determines whether general scan time limits are complied with. In some embodiments the general scan time limit is a predetermined number of seconds. In some embodiments the general scan time limit is between a first point in time and a second point in time. In some embodiments the first point in time is measured from a first bar code scan. In some embodiments the second point in time is measured from a second bar code scan. In some of such embodiments the predetermined number of seconds is between 0 to 86400 seconds. In some of such embodiments the general scan time limit increases as more consecutive valid scans take place. For example, if a first general scan time limit between a first valid scan and a second valid scan is 30 seconds, and a second general scan time limit between a second valid scan and a third valid scan is 30 seconds, a third general scan time to scan a fourth valid scan may increase to 120 seconds. In some embodiments the second bar code scan is a rescan of the first bar code scan. In some embodiments the general scan time limit is infinity. If the process determines general scan time limits are complied with, the process continues to block 613. Otherwise, the process continues to block 619.

In block 613, the process determines whether bar code scan number limits are complied with. In some embodiments a first bar code may only be scanned once. In some embodiments the first bar code may be scanned multiple times. In some of such embodiments the first bar code may be scanned an infinite number of times. In some of such embodiments the first bar code may be scanned a predetermined number of times, such as between 2 to 5 times. In some embodiments the first bar code may be scanned multiple times only if a second or more bar codes are scanned before a rescan of the first bar code. If the process determines bar code scan number limits are complied with, the process continues to block 615. Otherwise, the process continues to block 619.

In block 615, the process determines whether geo-fencing limits are complied with. In some embodiments geo-fencing limits restrict scanning to one or more predetermined distinct geographical areas. In some embodiments geo-fencing limits restrict scanning inside the predetermined distinct geographical area. In some embodiments the geographical area is a landmark such a pier or a park. In some embodiments the geographical area is a broad area, such as a neighborhood or a city. In some embodiments the process determines a scanning location based on a Global Positioning System (GPS) or a Wireless Fidelity (Wi-Fi) in communication with the portable electronic device. If the process determines geo-fencing limits are complied with, the process continues to block 617. Otherwise, the process continues to block 619.

In block 617, the process categorizes the bar code scan as valid. In some embodiments the valid bar code scan allows for setting a game facet status modification based on scanning of the bar code. Thereafter, the process returns.

In block 619, the process categorizes the bar code scan as invalid. In some embodiments the invalid bar code scan prohibits setting of a game facet status modification based on scanning of the bar code. Thereafter, the process returns.

Although the invention has been discussed with respect to various embodiments, it should be recognized that the invention comprises the novel and non-obvious claims supported by this disclosure.

What is claimed is:

1. A method for providing video game play benefits for scanning of bar codes, comprising:
    receiving information of a scanned bar code and a scanning location of the scanned bar code;
    determining that the information of the scanned bar code is a result of a scan considered valid, based at least in part on the scanning location being within a predetermined geographical area;
    determining a modification to a facet of a video game associated with at least some of the information of the scanned bar code, including;
        determining if a value of the scanned bar code is within a first dataset that correlates bar code values with modifications to facets of the video game, and if so, determining the modification from the first dataset based on the value of the scanned bar code; and
        if the value of the scanned bar code is not within the first dataset, determining that a value of a portion of the scanned bar code that represents a manufacturer is within a second dataset that correlates manufacturers with modifications to facets of the video game and determining the modification from the second dataset based on the value of the portion of the scanned bar code;
    modifying the facet of the video game with the determined modification; and
    providing for play of the video game.

2. The method of claim 1, wherein the facet of the video game is availability of at least one video game character for control by a game player.

3. The method of claim 1, wherein the facet of the video game is availability of at least one in-game item for use in play of the video game.

4. The method of claim 1, wherein the facet of the video game is a characteristic of at least one video game character.

5. The method of claim 1, wherein the facet of the video game is a characteristic of at least one in-game item for use in play of the video game.

6. The method of claim 1, wherein the value is a number uniquely indicating a manufacturer and a product.

7. A non-transitory computer readable memory storing program instructions that, when executed by at least one processor, perform a method comprising:
    receiving information of a scanned bar code and a scanning location of the scanned bar code;
    determining that the information of the scanned bar code is a result of a scan considered valid based at least in part on the scanning location being within a predetermined geographical area;
    determining a modification to a facet of a video game associated with at least some of the information of the scanned bar code, including:
        determining if a value of the scanned bar code is within a first dataset that correlates bar code values with modifications to facets of the video game, and if so, determining the modification from the first dataset based on the value of the scanned bar code; and if the value of the scanned bar code is not within the first dataset, determining that a value of a portion of the scanned bar code that represents a manufacturer is within a second dataset that correlates manufacturers with modifications to facets of the video game and determining the modification from the second dataset based on the value of the portion of the scanned bar code;

modifying the facet of the video game with the determined modification; and providing for play of the video game.

8. The non-transitory computer readable memory of claim 7, wherein the value is a number uniquely indicating a manufacturer and a product.

9. The non-transitory computer readable memory of claim 7, wherein the facet of the video game is availability of at least one video game character for control by a game player.

10. The non-transitory computer readable memory of claim 7, wherein the facet of the video game is availability of at least one in-game item for use in play of the video game.

11. The non-transitory computer readable memory of claim 7, wherein the facet of the video game is a characteristic of at least one video game character.

12. The non-transitory computer readable memory of claim 7, wherein the facet of the video game is a characteristic of at least one in-game item for use in play of the video game.

13. A non-transitory computer readable memory storing program instructions that, when executed by at least one processor, perform a method comprising:

receiving information of a scanned bar code;

determining that the information of the scanned bar code is a result of a scan considered valid based at least in part on the scanned bar code not having been scanned before by a game player associated with provision of the information of the scanned bar code within an immediately preceding period of time;

determining a modification to a facet of a video game associated with at least some of the information of the scanned bar code, including:

determining if a value of the scanned bar code is within a first dataset that correlates bar code values with modifications to facets of the video game, and if so, determining the modification from the first dataset based on the value of the scanned bar code; and if the value of the scanned bar code is not within the first dataset, determining that a value of a portion of the scanned bar code that represents a manufacturer is within a second dataset that correlates manufacturers with modifications to facets of the video game and determining the modification from the second dataset based on the value of the portion of the scanned bar code;

modifying the facet of the video game with the determined modification; and providing for play of the video game.

14. The non-transitory computer readable memory of claim 13, wherein the information of the scanned bar code is a value uniquely indicating a manufacturer and a product.

15. The non-transitory computer readable memory of claim 13, wherein the facet of the video game is availability of at least one video game character for control by a game player.

16. The non-transitory computer readable memory of claim 13, wherein the facet of the video game is availability of at least one in-game item for use in play of the video game.

17. The non-transitory computer readable memory of claim 13, wherein the facet of the video game is a characteristic of at least one video game character.

18. The non-transitory computer readable memory of claim 13, wherein the facet of the video game is a characteristic of at least one in-game item for use in play of the video game.

\* \* \* \* \*